United States Patent
Han et al.

(10) Patent No.: US 12,395,719 B2
(45) Date of Patent: Aug. 19, 2025

(54) CAMERA MODULE

(71) Applicant: SAMSUNG ELECTRO-MECHANICS CO., LTD., Suwon-si (KR)

(72) Inventors: Sang Hun Han, Suwon-si (KR); Soo Cheol Lim, Suwon-si (KR); Kum Kyung Lee, Suwon-si (KR); Jae Man Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 264 days.

(21) Appl. No.: 18/073,002

(22) Filed: Dec. 1, 2022

(65) Prior Publication Data

US 2023/0209165 A1 Jun. 29, 2023

(30) Foreign Application Priority Data

Dec. 29, 2021 (KR) .................. 10-2021-0191318

(51) Int. Cl.
*H04N 23/55* (2023.01)
*G03B 3/10* (2021.01)
(Continued)

(52) U.S. Cl.
CPC ............ *H04N 23/55* (2023.01); *G03B 3/10* (2013.01); *G03B 5/00* (2013.01); *H04N 23/51* (2023.01);
(Continued)

(58) Field of Classification Search
None
See application file for complete search history.

(56) References Cited

U.S. PATENT DOCUMENTS

2014/0043519 A1* 2/2014 Azuma ............... H04N 23/51
359/823
2015/0253583 A1* 9/2015 Cho .................... H04N 23/685
359/557
(Continued)

FOREIGN PATENT DOCUMENTS

CN 214959069 U 11/2021
JP 2016-206531 A 12/2016
(Continued)

OTHER PUBLICATIONS

Korean Office Action issued on Nov. 7, 2023, in counterpart Korean Patent Application No. 10-2021-0191318 (6 pages in English, 5 pages in Korean).

(Continued)

*Primary Examiner* — Paul M Berardesca
(74) *Attorney, Agent, or Firm* — NSIP Law

(57) ABSTRACT

A camera module is provided. The camera module includes a housing unit; a carrier, accommodated in the housing unit, and configured to move in an optical axis direction; a lens module, accommodated in the carrier, and in which one or more lenses are disposed; and a buffer member disposed on a side surface of the carrier, and configured to protrude in a direction perpendicular to the optical axis direction, and having a length in the optical axis direction, wherein the side surface of the carrier, on which the buffer member is disposed, has a length extending in the direction perpendicular to the optical axis direction.

18 Claims, 7 Drawing Sheets

(51) Int. Cl.
    *G03B 5/00*     (2021.01)
    *H04N 23/51*     (2023.01)
    *H04N 23/54*     (2023.01)
    *H04N 23/57*     (2023.01)
    *H04N 23/68*     (2023.01)

(52) U.S. Cl.
    CPC ............. *H04N 23/54* (2023.01); *H04N 23/57* (2023.01); *H04N 23/687* (2023.01); *G03B 2205/0015* (2013.01); *G03B 2205/0069* (2013.01)

(56) References Cited

U.S. PATENT DOCUMENTS

| | | |
|---|---|---|
| 2015/0296143 A1 | 10/2015 | Kang et al. |
| 2021/0173226 A1 | 6/2021 | Lee et al. |
| 2023/0007153 A1* | 1/2023 | Li .......................... G03B 30/00 |
| 2023/0012973 A1* | 1/2023 | Lim .................... H04N 23/687 |
| 2023/0251550 A1* | 8/2023 | Go ......................... G03B 5/00 |

FOREIGN PATENT DOCUMENTS

| | | | |
|---|---|---|---|
| KR | 10-1200080 B1 | 11/2012 | |
| KR | 10-2015-0058905 A | 5/2015 | |
| KR | 10-2015-0118008 A | 10/2015 | |
| KR | 10-2016-0148281 A | 12/2016 | |
| KR | 10-2018-0057594 A | 5/2018 | |
| KR | 10-2021-0014301 A | 2/2021 | |
| KR | 10-2021-0073420 A | 6/2021 | |
| WO | WO-2023140527 A1 * | 7/2023 | ............... G03B 3/10 |

OTHER PUBLICATIONS

Chinese Office Action Issued on Apr. 30, 2025, in Counterpart Chinese Patent Application No. 202211706514.X (5 Pages in English, 9 Pages in Chinese).

* cited by examiner

CAMERA MODULE

CROSS-REFERENCE TO RELATED APPLICATIONS

This application claims the benefit under 35 USC § 119(a) of Korean Patent Application No. 10-2021-0191318 filed on Dec. 29, 2021, in the Korean Intellectual Property Office, the entire disclosure of which is incorporated herein by reference for all purposes.

BACKGROUND

1. Field

The following description relates to a camera module.

2. Description of Related Art

Recently, camera modules have been provided in portable electronic devices such as, but not limited to, tablet personal computers (PCs), laptop computers, as well as smartphones.

Typically, the camera module that is implemented in the portable electronic device has an autofocusing (AF) function or operation, and an optical image stabilization (OIS) function or operation, and a zoom function or operation added thereto.

However, the camera module including various functions added thereto may have a complicated structure and a large size, and a large amount of flow noise may occur when the camera module is driven.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a camera module includes a housing unit; a carrier, accommodated in the housing unit, and configured to move in an optical axis direction; a lens unit, accommodated in the carrier, and in which one or more lenses are disposed; and a buffer member, disposed on a side surface of the carrier, and configured to protrude in a direction perpendicular to the optical axis direction, and having a length in the optical axis direction, wherein the side surface of the carrier, on which the buffer member is disposed, has a length that extends in the direction perpendicular to the optical axis direction.

The housing unit may include a groove portion that extends in the optical axis direction, and configured to accommodate at least a portion of the buffer member.

The buffer member may include a plurality of buffer members, and the plurality of buffer members are disposed on the side surface of the carrier in a first direction perpendicular to the optical axis direction.

The plurality of buffer members may include a first buffer member disposed to face the housing unit in the first direction.

The plurality of buffer members further include a second buffer member disposed to face the housing unit in a second direction perpendicular to the optical axis direction and the first direction.

The second buffer member may have a cross section perpendicular to the optical axis direction that is larger than the first buffer member.

A distance between the housing unit and the buffer member in the optical axis direction may be less than a distance between the carrier and the housing unit in the optical axis direction.

The housing unit may include a housing configured to accommodate the carrier; and a shield can that is coupled to the housing while the housing accommodates the carrier, and wherein the buffer member is configured to come into contact with the housing or the shield can when the carrier is moved in the optical axis direction.

The buffer member may include a mounting portion coupled to the carrier; and a deformed portion, mounted on the mounting portion, and configured to deform when in contact with the housing unit when the carrier is moved in the optical axis direction.

The deformed portion may have a symmetrical structure with respect to the direction perpendicular to the optical axis direction.

The camera module may further include a first actuator unit configured to move the carrier and the lens unit in the optical axis direction; and a second actuator unit configured to move the lens unit in the direction perpendicular to the optical axis direction.

In a general aspect, a camera module includes a carrier configured to accommodate a lens unit; a housing configured to accommodate the carrier; a shield can coupled to the housing while the housing accommodates the carrier; and a buffer member disposed on a side surface of the carrier, and configured to protrude in a direction perpendicular to an optical axis direction, and having a length in the optical axis direction, wherein the carrier is configured to move relative to the housing and the shield can in the optical axis direction, and wherein the buffer member is configured to come into contact with the shield can or the housing when the carrier is moved in the optical axis direction.

A distance between the buffer member and the shield can in the optical axis direction may be less than a distance between the carrier and the shield can in the optical axis direction.

The housing may include a groove portion that extends in the optical axis direction, and wherein the groove portion accommodates at least a portion of the buffer member.

A distance between the buffer member and the groove portion in the optical axis direction may be less than a distance between the carrier and the housing in the optical axis direction.

The buffer member may include a first buffer member disposed to face the shield can in a first direction perpendicular to the optical axis direction; and a second buffer member disposed to face the shield can in a second direction perpendicular to the optical axis direction and the first direction.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
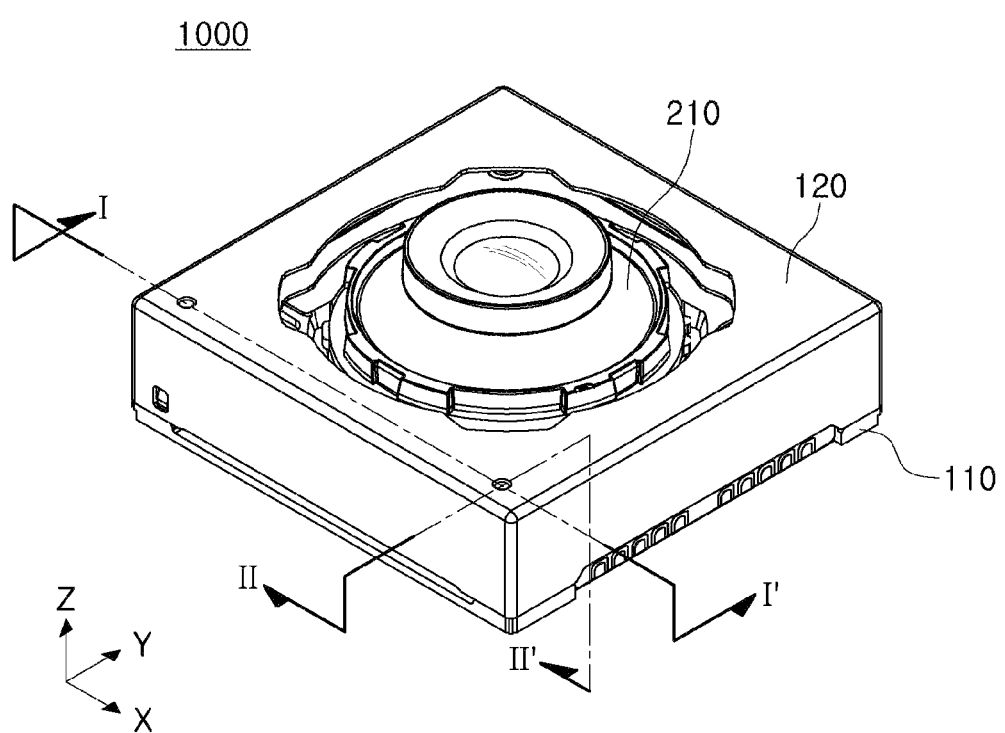
FIG. 1 illustrates a perspective view of an example camera module, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

The following description relates to a camera module, and may be applied to any of various types of portable electronic devices such as, but not limited to, a mobile communications terminal, a smartphone or a tablet personal computer (PC), as only examples.

The camera module is an optical device (hereinafter, an actuator) that captures an image or a video, and may include a lens that refracts light reflected from a subject and a lens driving device that moves the lens to adjust a focus or stabilize the image.

One or more examples may provide a camera module which reduces flow noise occurring when the camera module is moved in an optical axis direction.

Figure 2:
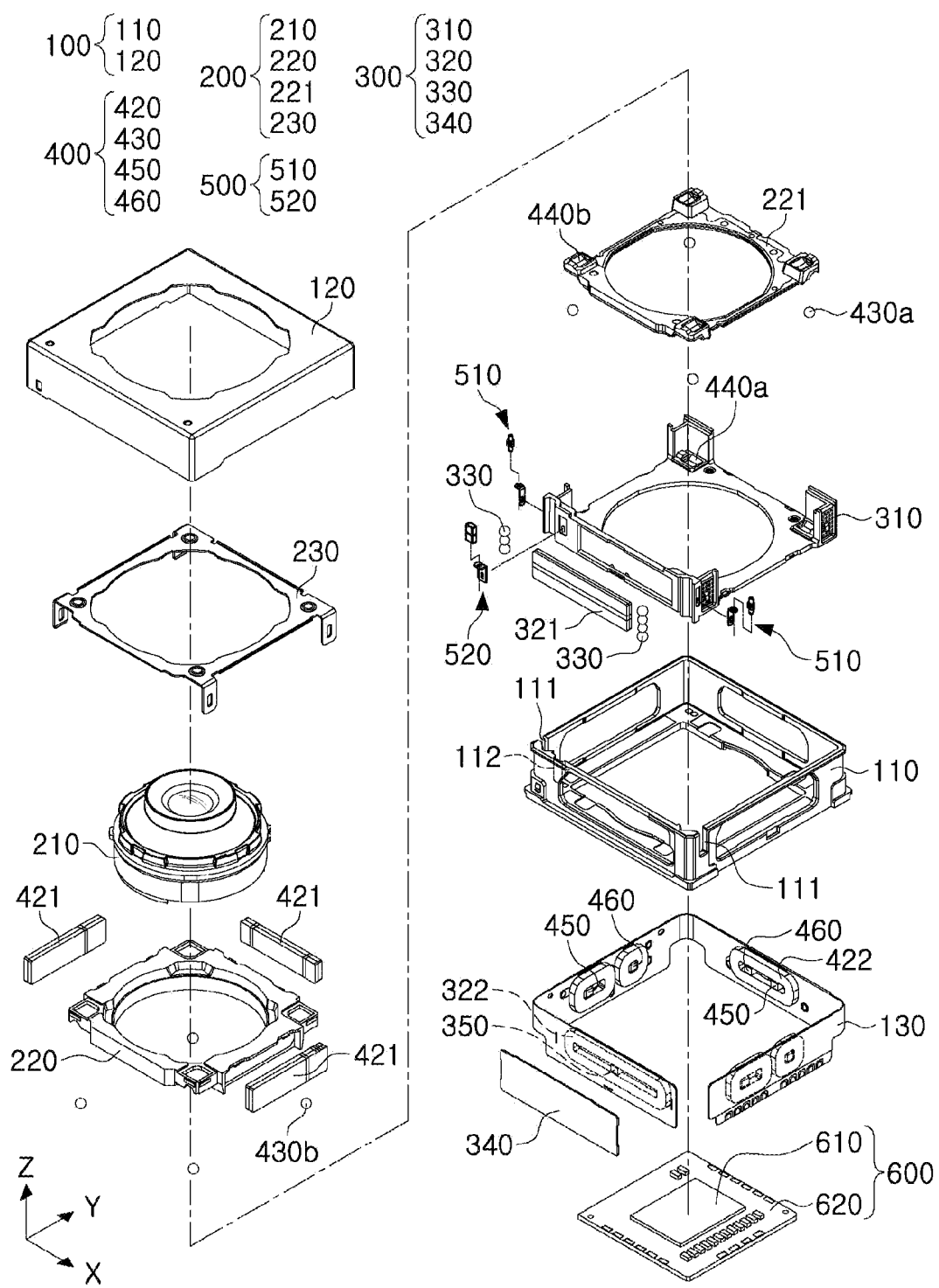
FIG. 2 illustrates a schematic exploded perspective view of an example camera module, in accordance with one or more embodiments.

FIG. 1 illustrates a perspective view of an example camera module, in accordance with one or more embodiments, and FIG. 2 illustrates a schematic exploded perspective view of an example camera module, in accordance with one or more embodiments.

Referring to FIGS. 1 and 2, a camera module 1000, in accordance with one or more embodiments, may include a housing unit 100, a lens unit 200, an actuator unit 300 or 400, and an image sensor unit 600, and a buffer member 500 that reduces a flow noise when the lens unit 200 is driven.

The housing unit 100 may include a housing 110 and a shield can 120.

The housing 110 may be formed of a material that is easily molded. As a non-limiting example, the housing 110 may be made of plastic.

The housing 110 may accommodate the lens unit 200 and the actuator units 300 and 400.

The housing 110 may have an inner space and the top, bottom and all or some parts of four sides of the housing may be open. The housing 110 may accommodate the lens unit 200 and the actuator units 300 and 400 in the inner space and the open part.

For example, the lens unit 200 may be disposed in the inner space of the housing 110, and the actuator units 300 and 400 may be disposed in the inner space of the housing 110 and the open part of the housing 110. Additionally, the image sensor unit 600 may be disposed at the open part of the bottom of the housing 110.

The shield can 120 may be coupled to the housing 110 to surround the housing 110.

The shield can 120 may protect components accommodated in the housing 110 from impacts.

Additionally, the shield can 120 may shield the components accommodated in the housing 110 from electromagnetic waves. For example, the shield can 120 may ensure that the electromagnetic waves occurring in the camera module 1000 does not affect another electronic component in the portable electronic device. On the other hand, the shield can 120 may ensure that the electromagnetic waves occurring in another electronic component mounted in the portable electronic device does not affect the camera module 1000.

In an example, the shield can 120 may be made of a metal material to shield the electromagnetic waves, and may be grounded into a ground pad of a printed circuit board 620 on which an image sensor 610 of the image sensor unit 600 described below is disposed.

The lens unit 200 may include a lens barrel 210 and a lens holder 220.

One or more lenses that capture an image of a subject may be disposed in the lens barrel 210. One or more required lenses having the same or different optical properties (e.g., refractive indices) may be disposed in the lens barrel 210.

The lens barrel 210 may have a shape of a hollow cylinder, and may have an inner space, and the lens barrel 210 may accommodate one or more lenses in the inner space. The inner space of the lens barrel 210 may be determined based on the number of lenses disposed in the lens barrel 210, and one or more lenses may be mounted inside the lens barrel 210 along an optical axis direction (the Z-axis direction).

The lens holder 220 may be coupled to the lens barrel 210. For example, the lens holder 220 may be coupled to the lens barrel 210 while surrounding the lens barrel 210. The lens holder 220 may have a space in which the lens barrel 210 is inserted, and the lens barrel 210 may be fixed to the space of the lens holder 220.

The lens holder 220 may guide movement of the lens barrel 210. The lens barrel 210 may be moved to the optical axis direction (the Z-axis direction) or a direction (or X-axis or Y-axis direction) perpendicular to the optical axis direction while being coupled to the lens holder 220.

A frame 221 may be disposed at the bottom of the lens holder 220. For example, the frame 221 may be disposed between the lens holder 220 and a carrier 310 described below. That is, the lens holder 220, the frame 221 and the carrier 310 may be arranged in order based on the optical axis direction (the Z-axis direction).

Some components included in the second actuator 400 described below may be disposed on the lens holder 220 and the frame 221. For example, a magnet that generates a driving force to move or drive the lens barrel 210 in the optical axis direction (or the X-axis or the Y-axis direction) may be disposed in the lens holder 220, and ball members that guide movement of the lens barrel 210 in the direction (or the X-axis or Y-axis direction) perpendicular to the optical axis direction may be disposed on the frame 221. Details related thereto are described below.

In an example, the camera module 1000, in accordance with one or more embodiments, may further include a stopper 230 to prevent deviation of the components caused by an external impact.

The stopper 230 may be coupled to the carrier 310 to cover at least a portion of an upper surface of the lens holder 220.

The stopper 230 may prevent the frame 221, a plurality of ball members 330 and the like, as well as the lens holder 220 from being deviated outward from the carrier 310 by a rapid movement or by an external impact. Additionally, the stopper 230 may include a damper (not shown) on its surface facing the lens holder 220 in the optical axis direction (the Z-axis direction) to reduce a noise occurring when the lens holder 220 or the like is shaken by the external impact.

The actuator units 300 and 400 may be the first actuator unit 300 to perform an autofocusing (AF) operation, and the second actuator unit 400 to perform an optical image stabilization (OIS) operation.

The camera module 1000, in accordance with one or more embodiments, may include one or more of the first actuator unit 300 and the second actuator unit 400, and may include both the first actuator unit 300 and the second actuator unit 400.

The first actuator unit 300 may be a component that moves the lens unit 200 to focus on the subject.

The first actuator unit 300 may include the carrier 310 and a first driver 320. The carrier 310 may be accommodated in the housing 110 and accommodate the lens unit 200, and the first driver 320 may generate the driving force to move the lens unit 200 and the carrier 310 in the optical axis direction (the Z-axis direction).

The first driver 320 may include a magnet and a coil (hereinafter, a first magnet 321 and a first coil 322).

In one or more examples, the first magnet 321 may be disposed on one surface of the carrier 310, and the first coil 322 may be disposed in the housing 110. The first coil 322 may be disposed in the open part of the housing 110 through a substrate 130, and may be disposed to oppose the first magnet 321.

The first magnet 321 may be a mobile member that is disposed on the carrier 310, and may move together with the carrier 310 in the optical axis direction (Z-axis direction), and the first coil 322 may be a fixed member fixed to the housing 110. However, the one or more examples are not limited thereto, and the positions of the first magnet 321 and the first coil 322 may be switched with each other, such that the first magnet 321 is a fixed member and the first coil 322 is a mobile member.

The carrier 310 may be moved in the optical axis direction (the Z-axis direction) by an electromagnetic force generated between the first magnet 321 and the first coil 322 when power is applied to the first coil 322. The lens unit 200 may be accommodated in the carrier 310, and the lens unit 200 may thus also be moved in the optical axis direction (the Z-axis direction) as the carrier 310 is moved in the optical axis direction (the Z-axis direction).

That is, the carrier 310 and the lens unit 200 may be moved relative to the housing unit 100 based on the first driver 320 in the optical axis direction (the Z-axis direction) while being accommodated in the housing unit 100.

The carrier 310 may be smoothly moved by the ball members 330 in the optical axis direction (the Z-axis direction). The ball members 330 may be disposed on the one surface of the carrier 310, on which the first magnet 321 is disposed, and may be disposed on both sides of the first magnet 321. The ball members 330 may be disposed between the carrier 310 and the housing 110 to reduce a friction force acting between the carrier 310 and the housing 110 when the carrier 310 is moved.

A yoke 340 may be disposed on the housing 110. The yoke 340 may be disposed to face the first magnet 321 while having the first coil 322 interposed therebetween.

The yoke 340 may be a magnetic body, and an attraction force may act between the yoke 340 and the first magnet 321 in the direction perpendicular to the optical axis (the Z-axis direction). The ball member 330 may remain in contact with the carrier 310 and the housing 110 by the attraction force acting between the yoke 340 and the first magnet 321.

Additionally, the yoke 340 may also operate to focus on a magnetic force of the first magnet 321. For example, the yoke 340 and the first magnet 321 may form a magnetic circuit. Accordingly, it is possible to prevent leakage of magnetic flux.

In an example, although not shown in the drawings, the yoke 340 may be disposed between the carrier 310 and the first magnet 321, and the yoke 340 may focus on the magnetic force of the first magnet 321 to prevent the leakage of the magnetic flux.

A position sensor 350 may be disposed on the housing 110. The position sensor 350 may be disposed in the open part of the side surface of the housing 110 through the substrate 130 together with the first coil 322, and may be disposed to face the first magnet 321.

The camera module 1000, in accordance with one or more embodiments, may use a waste loop control method in which a position of the lens unit 200 is detected and a feedback is provided.

The position sensor 350 may detect the position of the lens unit 200. In an example, the position sensor 350 may be a hall sensor.

An initial position of the lens unit 200 may be detected by the position sensor 350 when the camera module 1000 is powered on, and the lens unit 200 may be moved from the detected initial position to an initial setting position. In an example, the initial position may indicate the position of the lens unit 200 in the optical axis direction, and the initial setting position may indicate the position of the lens unit 200 where a focus of the lens unit becomes infinite.

The lens unit 200 may be moved from the initial setting position to a target position based on a driving signal of a circuit element that provides the driving signal for the first driver 320. The lens unit 200 may be moved in both directions in the optical axis direction, (the Z-axis direction), during a focusing process.

The second actuator unit 400 may be a component for moving the lens unit 200 to correct a blurred image or an unstable video due to a factor such as a shaken user hand when capturing the image or video.

The second actuator unit 400 may include a second driver 420 (421, 422). The second driver 420 may generate a driving force to move the lens unit 200 in a direction (or X-axis or Y-axis direction) perpendicular to the optical axis direction.

The second driver 420 may include a magnet and a coil (hereinafter, a second magnet or magnets 421 and a second coil 422).

In one or more examples, the second magnet(s) 421 may be disposed on one surface of the lens holder 220. In an example, a plurality of second magnets 421 may be provided, and the plurality of second magnets 421 may be disposed on different surfaces of the lens holder 220.

The second coil 422 may be disposed on the housing 110. In an example, a plurality of second coils 422 may be provided, and the plurality of second coils 422 may be disposed in the open part of the side surface of the housing 110 through the substrate 130 to respectively face the plurality of second magnets 421.

The plurality of second magnets 421 may be displaced on the lens holder 220, and may be moved in a direction (or X-axis or Y-axis direction) perpendicular to the optical axis direction, and the plurality of first coils 422 may be fixed members respectively fixed to the housing 110. However, the one or more examples are not limited thereto, and may include examples in which positions of the second magnet 421 and the second coil 422 are switched with each other, such that the second magnet 421 is a fixed member and the second coil 422 is a mobile member.

The lens unit 200 may be moved in a direction (or X-axis or Y-axis direction) perpendicular to the optical axis direction by an electromagnetic force generated between the second magnet 421 and the second coil 422 when power is applied to the second coil 422.

Referring to the drawings, the second magnet 421 and the second coil 422 of the second driver 420, which are disposed parallel to the Y-axis direction, may generate a driving force in the X-axis direction, and the second magnet 421 and the second coil 422, which are disposed parallel to the X-axis direction, may generate a driving force in the Y-axis direction.

That is, the lens unit 200 may be moved relative to the housing unit 100 by the second driver 420 in the direction (or X-axis or Y-axis direction) perpendicular to the optical axis direction while being accommodated in the housing unit 100 and the carrier 310.

The movement of the lens unit 200 based on the second driver 400 may be guided by ball members 430a and 430b.

The ball members 430a and 430b may respectively be disposed between the lens holder 220 and the frame 221, and between the frame 221 and the carrier 310. That is, the ball members 430a and 430b may be disposed in two stages in the optical axis direction (the Z-axis direction).

The ball members 430a and 430b may support the lens holder 220 and the frame 221 while guiding the movement of the lens unit 200. Additionally, the ball members 430a and 430b may also operate to maintain a distance between the lens holder 220, the frame 221 and the carrier 310.

The ball members 430a and 430b may include the first ball members 430a and the second ball members 430pu b.

The first ball members 430a may include the plurality of ball members disposed between the frame 221 and the carrier 310. The first ball members 430a may guide the movements of the lens barrel 210, the lens holder 220, and the frame 221 in the X-axis direction.

The second ball members 430b may include the plurality of ball members disposed between the lens holder 220 and the frame 221. The second ball members 430b may guide the movements of the lens barrel 210 and the lens holder 220 in the Y-axis direction.

The ball members 430a and 430b may roll when a driving force is generated by the second driver 420. For example, guide grooves 440a or 440b, in which the respective ball members 430a or 430b are accommodated, may be positioned in opposite surfaces of the lens holder 220 and the frame 221, or in opposite surfaces of the frame 221 and the carrier 310 in the optical axis direction (the Z-axis direction), and the ball members 430a or 430b may roll in the guide grooves 440a or 440b.

The guide grooves 440a or 440b may include the first guide grooves 440a or the second guide grooves 440b.

The first guide grooves 440a may be positioned in one surface of the frame 221 and one surface of the carrier 310 opposite to each other in the optical axis direction (the Z-axis direction), and the first ball members 430a may be accommodated in the first guide groove 440a and fitted between the frame 221 and the carrier 310.

The first ball members 430a may roll in the first guide groove 440a only in the X-axis direction when the driving force is generated by the second driver 420. Accordingly, a plane shape of the first guide groove 440a may be a rectangle having a length in the X-axis direction.

The second guide grooves 440b may be positioned in one surface of the lens holder 220 and one surface of the frame 221 opposite to each other in the optical axis direction (the Z-axis direction), and the second ball members 430b may be accommodated in the second guide groove 440b and fitted between the lens holder 220 and the frame 221.

The second ball members 430a may roll in the second guide groove 440b only in the Y-axis direction when the driving force is generated by the second driver 420. Accordingly, a plane shape of the first guide groove 440b may be a rectangle having a length in the Y-axis direction.

A position sensor 450 may be disposed on the housing 110. The position sensor 450 may be disposed in the open part of the side surface of the housing 110 through the substrate 130 together with the second coil 422, and disposed to face the second magnet 421.

The camera module 1000, in accordance with one or more embodiments, may use a waste loop control method in which a position of the lens barrel 210 is detected and a feedback is provided.

The position sensor 450 may detect the position of the lens barrel 210. In an example, the position sensor 450 may be a hall sensor.

A damper 460 may be disposed on the housing 110. The damper 460 may be disposed in the open part of the side surface of the housing 110 through the substrate 130 together with the second coil 422 and the position sensor 450, and may be disposed to face the second magnet 421. The damper 460 may be disposed in a hollow portion of each of the plurality of second coils 422.

The damper 460 may prevent a direct collision between the second magnet 421 and the second coil 422 when the lens unit 200 is moved by the second driver 420 in a direction (or X-axis or Y-axis direction) perpendicular to the optical axis direction. Accordingly, the damper 460 may protrude toward the second magnet 421 more than the second coil 422.

The image sensor unit 600 may include an image sensor 610 and a printed circuit board 620.

The image sensor 610 may convert light incident through the lens unit 200 into an electrical signal. In an example, the image sensor 610 may be a charge coupled device (CCD) or a complementary metal-oxide semiconductor (CMOS).

The electrical signal converted by the image sensor 610 may be output as the image through a display device of the portable electronic device.

The image sensor 610 may be fixedly disposed on the printed circuit board 620. The image sensor 610 may be electrically connected to the printed circuit board 620 through wire bonding.

Although not shown in the drawings, the image sensor unit 600 may further include an infrared filter. The infrared filter may operate to block light in an infrared region in the light incident thereto through the lens unit 200.

In an example, the camera module 1000, in accordance with one or more embodiments, may include the buffer member 500 that reduces the flow noise when the lens unit 200 is driven.

In one or more examples, the buffer member 500 may reduce the flow noise that occurs due to the collision of the carrier 310 or the lens unit 200 with the housing unit 100 when the carrier 310 or the lens unit 200 is moved in the optical axis direction (the Z-axis direction).

Figure 3:
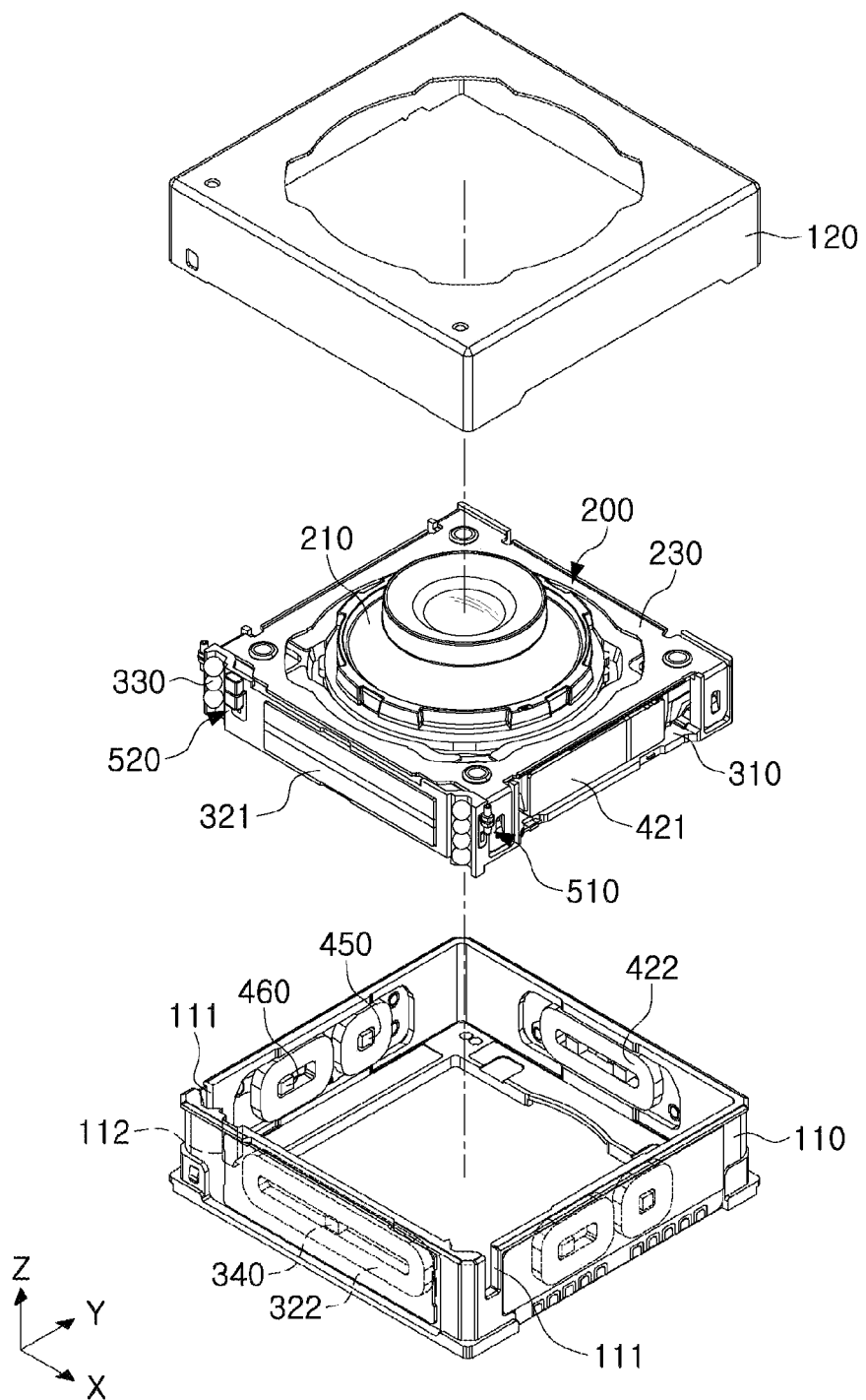
FIG. 3 illustrates an exploded view of the camera module of FIG. 1 from which a housing unit is disassembled.

FIG. 3 illustrates an exploded view of the camera module of FIG. 1 from which the housing unit is disassembled.

Referring to FIG. 3, the camera module 1000, in accordance with one or more embodiments, may include the buffer member 500.

The buffer member 500 (510, 520) may be disposed on the carrier 310. For example, the buffer member 500 may be disposed on a side surface of the carrier 310, and may be disposed parallel to the first magnet 321 and the ball members 330.

The buffer member 500 may have a length in the optical axis direction (the Z-axis direction). The buffer member 500 may be disposed on the side surface of the carrier 310 and may thus have a length in the optical axis direction (the Z-axis direction).

The buffer member 500 may be disposed on the side surface of the carrier 310, and may thus have a sufficient length in the optical axis direction (the Z-axis direction) without being restricted by a driving distance of the carrier 310 in the optical axis direction (the Z-axis direction) or by an increase in a height of the camera module 1000.

The buffer member 500 may be accommodated in the housing unit 100 while being disposed on the carrier 310. That is, the buffer member 500 may be accommodated in the housing unit 110 and the shield can 120 while being disposed on the carrier 310.

The carrier 310 may then be moved in the optical axis direction (the Z-axis direction) by the first actuator 300 while being accommodated in the housing 110 and the shield can 120, and the lens unit 200 may also be moved in the optical axis direction (the Z-axis direction).

The buffer member 500 may be disposed on the side surface of the carrier 310 and may have a length in the optical axis direction (the Z-axis direction), such that the carrier 310 comes into contact with the housing 110 or the shield can 120 when the carrier is moved in the housing unit 100 relative to the housing unit 100 in the optical axis direction (or Z-axis direction).

The buffer member 500 may have a sufficient length in the optical axis direction (or Z-axis direction). In this example, contact time between the housing unit 100 and the carrier 310 (or the lens unit 200) may be increased when the buffer member 500 collides with the housing unit 100 as the carrier 310 is moved in the optical axis direction (the Z-axis direction). Accordingly, an impact force (or magnitude of the force) for a certain impact energy may be reduced, thereby reducing the flow noise.

Hereinafter, the buffer member 500, in accordance with one or more embodiments, is described in more detail.

Figure 4:
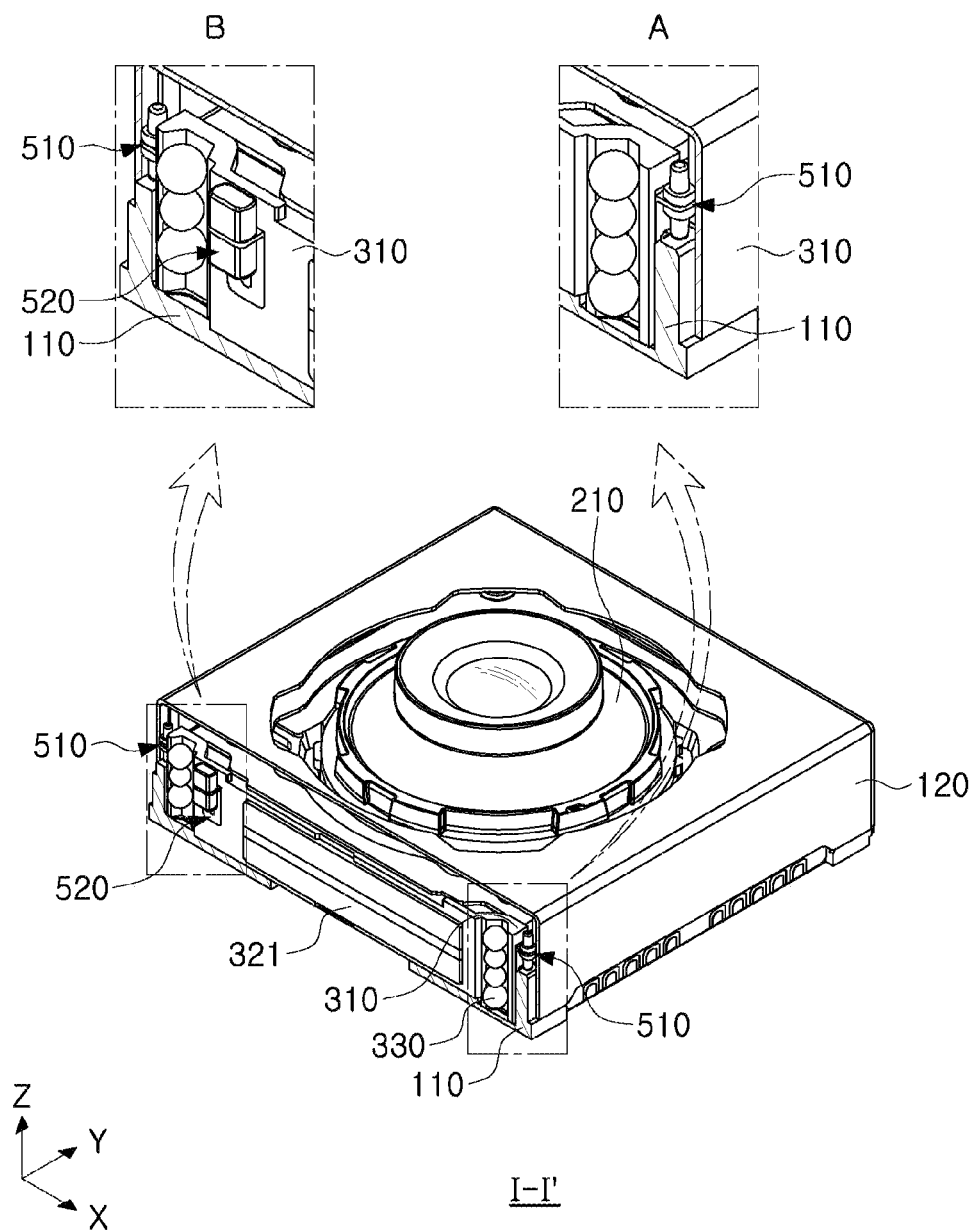
FIG. 4 illustrates a cut-away perspective view taken along line I-I' of the camera module of FIG. 1.
Figure 5:
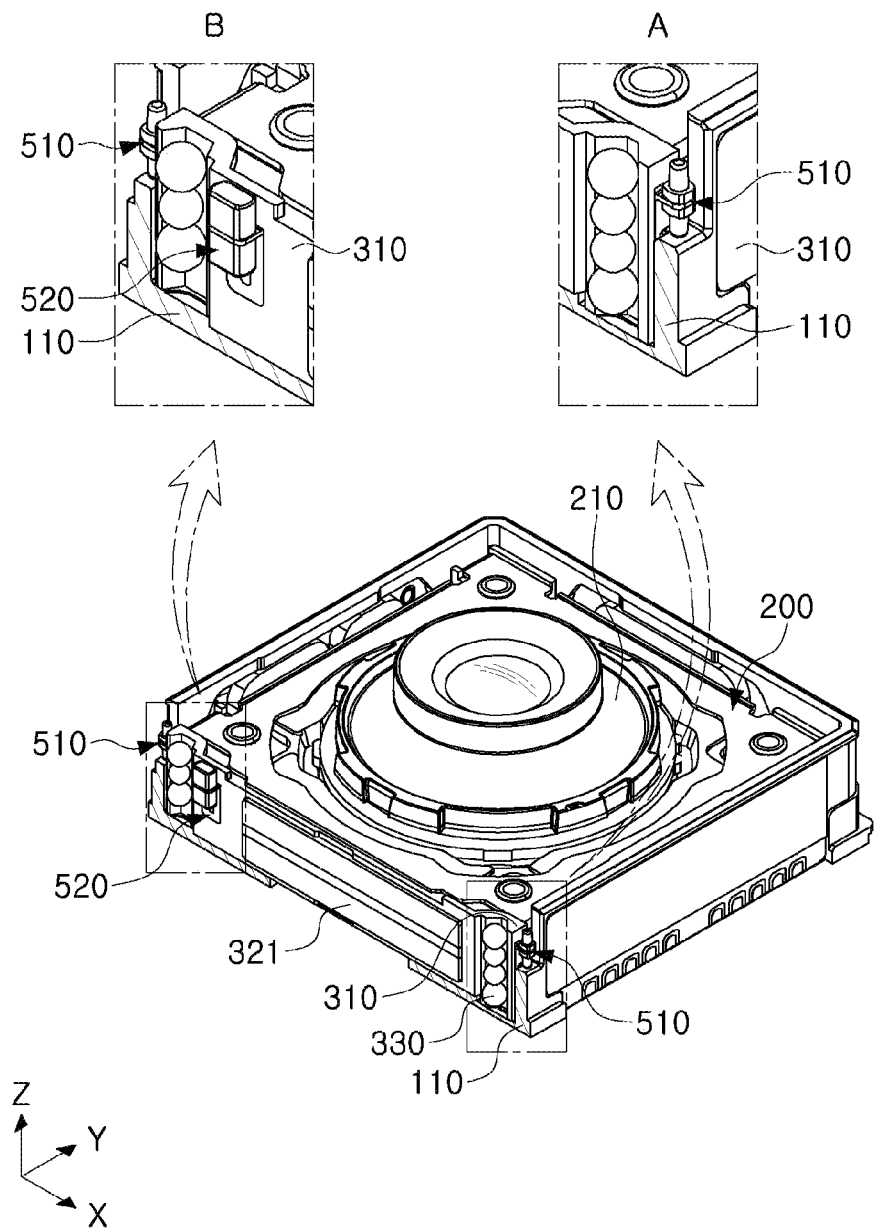
FIG. 5 illustrates a perspective view of the camera module of FIG. 4 from which a shield can is removed.
Figure 6A:
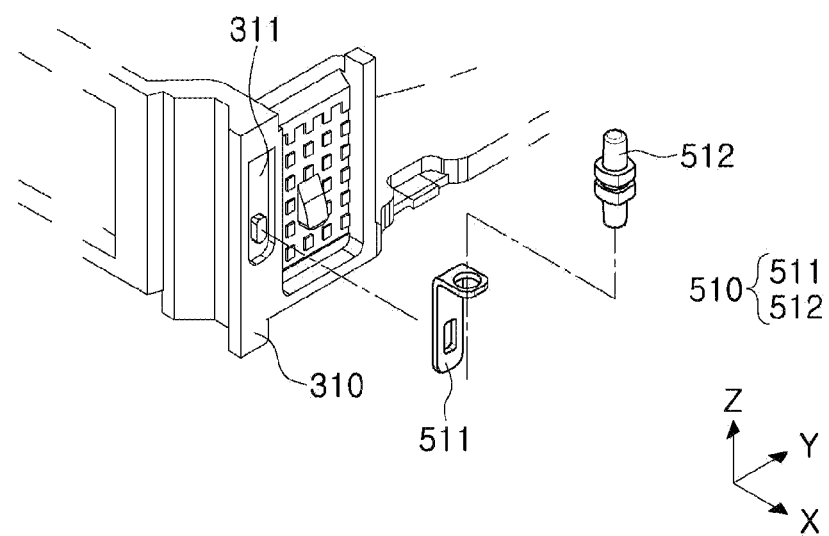
FIGS. 6A and FIG. 6B illustrate respective exploded views of regions A and B of FIGS. 4 and 5.
Figure 6B:
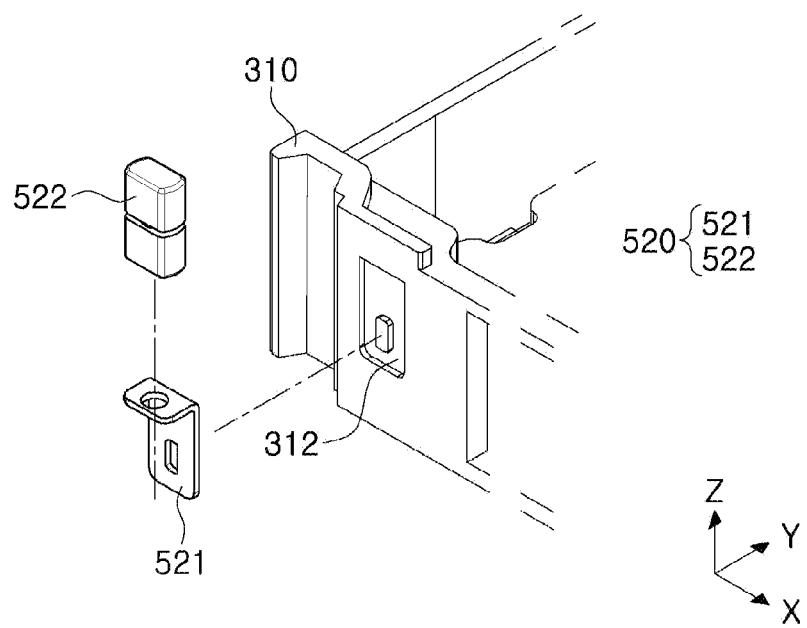
Figure 7A:
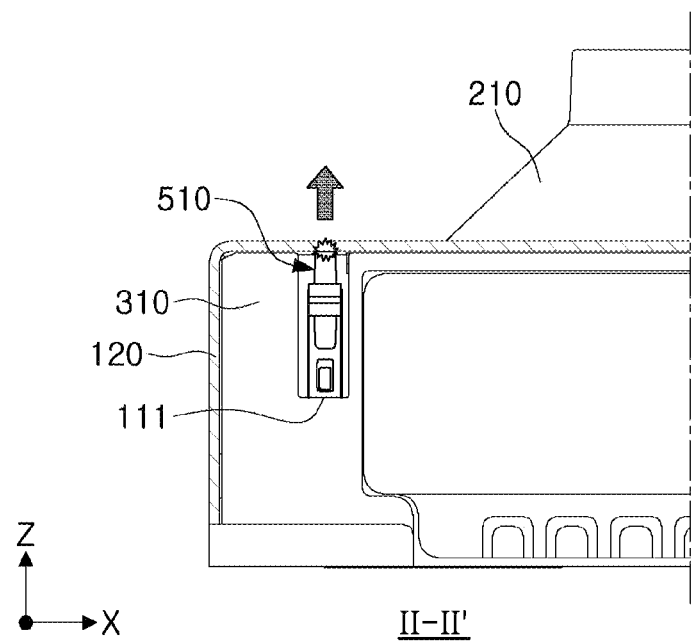
FIGS. 7A and 7B illustrate conceptual diagrams showing that a buffer member is deformed while the carrier is moved in the optical axis direction.
Figure 7B:
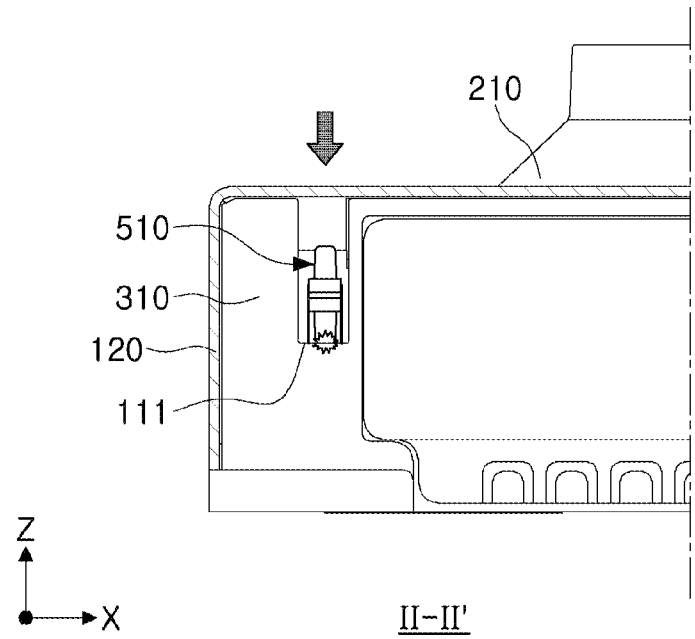

FIG. 4 is a cut-away perspective view taken along line I-I' of the camera module of FIG. 1; FIG. 5 is a perspective view of the camera module of FIG. 4 from which the shield can is removed; FIGS. 6A and 6B are respective exploded views of regions A and B of FIGS. 4 and 5; and FIG. 7 is a conceptual diagram showing that the buffer member is deformed while the carrier is moved in the optical axis direction.

Additionally, the X-axis direction is hereinafter referred to as a first direction and the Y-axis direction is referred to as a second direction among the directions perpendicular to the optical axis direction with reference to the drawings.

In one or more examples, the plurality of buffer members 500 may be provided. The plurality of buffer members 500 may be disposed on the side surface of the carrier 310.

In an example, the plurality of buffer members 500 may be disposed on the side surface of the carrier 310 in a first direction perpendicular to the optical axis direction (or Z-axis direction), and may be disposed on different parts of the side surface of the carrier 310.

The plurality of buffer members 500 may include a first buffer member 510 and a second buffer member 520. For example, the plurality of buffer members 500 may include the first buffer member 510 facing the housing unit 100 in a first direction perpendicular to the optical axis direction.

In another example, the plurality of buffer members 500 may include the first buffer member 510 facing the housing unit 100 in the first direction perpendicular to the optical axis direction and the second buffer member 520 facing the housing unit 100 in the second direction perpendicular to the optical axis direction and the first direction, as shown in the accompanying drawings.

The first buffer member 510 may be disposed on the side surface of the carrier 310 to protrude in the first direction perpendicular to the optical axis direction (or Z-axis direction), and may be disposed to face the housing unit 100 in the first direction. Specifically, the first buffer member 510 may be disposed to face the shield can 120 in the first direction while being accommodated in a first groove portion 111 of the housing 110.

The housing 110 may include the first groove portion 111, in which a portion of the first buffer member 510 is accommodated, at a position corresponding to the disposed position of the first buffer member 510.

The first groove portion 111 may extend in the optical axis direction (or Z-axis direction) to accommodate a portion of the first buffer member 510, and may have a size sufficient to accommodate the first buffer member 510. One end of the first buffer member 510 that faces the housing 110 in the optical axis direction (or Z-axis direction) may be accommodated in the first groove portion 111.

One end of the first buffer member 510 may be in contact with a bottom surface of the first groove portion 111, or a minute gap may exist between one end of the first buffer member 510 and the bottom surface of the first groove portion 111, while the first buffer member 510 is accommodated in the first groove portion 111.

In accordance with one or more embodiments, a distance between a first end of the first buffer member 510 and the first groove 111 in the optical axis direction (or Z-axis direction) may be less than a distance between the carrier 310 and the housing 110 in the optical axis direction (or Z-axis direction).

Additionally, a second end of the first buffer member 510 may slightly protrude outward from the first groove portion 111 while the first buffer member 510 is accommodated in the first groove portion 111. Accordingly, a distance between the second end of the first buffer member 510 and the shield can 120 in the optical axis direction (the Z-axis direction) may be less than a distance between the carrier 310 and the shield can 120 in the optical axis direction (the Z-axis direction).

In accordance with one or more embodiments, the distance between the first end or the second end of the first buffer member 510 in a length direction and the housing unit 100 in the optical axis direction (the Z-axis direction) may be less than the distance between the carrier 310 and the housing unit 100 in the optical axis direction (the Z-axis direction). Therefore, the first buffer member 510 may first come into contact with the housing unit 100 when the carrier 310 is moved in the optical axis direction (the Z-axis direction), thereby reducing a noise occurring due to a collision between the carrier 310 (or the lens unit 200) and the housing unit 100.

Meanwhile, in the example camera module 1000, the second buffer member 520, that operates to supplement the first buffer member 510, may be selectively positioned on the side surface of the carrier 310.

The second buffer member 520 may be disposed on one surface of the carrier 310 on which the first magnet 321 is disposed. The first magnet 321 may be disposed on the side surface of the carrier 310, and the second buffer member 520 may thus also be disposed on the side surface of the carrier 310.

The second buffer member 520 may be disposed to face the housing unit 100 in the second direction perpendicular to the optical axis direction (the Z-axis direction) and the first direction. Specifically, the second buffer member 520 may be disposed to face the shield can 120 in the second direction while being accommodated in a second groove portion 112 of the housing 110.

The housing 110 may include the second groove portion 112, in which a portion of the second buffer member 520 is accommodated, at a position corresponding to the disposed position of the second buffer member 520.

The second groove portion 112 may extend in the optical axis direction (the Z-axis direction) to accommodate a portion of the second buffer member 520, and may have a size sufficient to accommodate the second buffer member 520. One end of the second buffer member 520 that faces the housing 110 in the optical axis direction (the Z-axis direction) may be accommodated in the second groove portion 112.

The second buffer member 520 may have a cross section perpendicular to the optical axis direction (the Z-axis direction) larger than the first buffer member 510. In other words, the second buffer member 520 may be in contact with the shield can 120 or the housing 110 in a larger area than the first buffer member 510.

In accordance with one or more embodiments, the camera module 1000 may include the first buffer member 510, a length of the carrier 310 in the first direction may thus be increased, and thus there is a limit to increasing a size of the first buffer member 510. However, the second buffer member 520 may be disposed in an empty space of one surface of the carrier 310 on which the first magnet 321 is disposed, and the area of the second buffer member 520 may thus be positioned relatively freely.

Accordingly, dispersion and reduction of the impact force may be improved when the camera module 1000 includes both the first buffer member 510 and the second buffer member 520.

One end of the second buffer member 520 may be in contact with a bottom surface of the second groove portion 112, or a minute gap may exist between one end of the second buffer member 520 and the bottom surface of the second groove portion 112, while the second buffer member 520 is accommodated in the second groove portion 112.

In accordance with one or more embodiments, a distance between one end of the second buffer member 520 and the second groove 112 in the optical axis direction (the Z-axis direction) may be less than a distance between the carrier 310 and the housing 110 in the optical axis direction (the Z-axis direction).

Additionally, the second end of the second buffer member 520 may slightly protrude outward from the second groove portion 112 while the second buffer member 520 is accommodated in the second groove portion 112. Accordingly, a distance between the second end of the second buffer member 520 and the shield can 120 in the optical axis direction (the Z-axis direction) may be less than a distance between the carrier 310 and the shield can 120 in the optical axis direction (the Z-axis direction).

In accordance with one or more embodiments, the distance between the first end or the second end of the second buffer member 520 in the length direction and the housing unit 100 in the optical axis direction (the Z-axis direction) may be less than the distance between the carrier 310 and the housing unit 100 in the optical axis direction (the Z-axis direction). Therefore, the second buffer member 520 may first come into contact with the housing unit 100 when the carrier 310 is moved in the optical axis direction (the Z-axis direction), thereby reducing the noise occurring due to the collision between the carrier 310 (or the lens unit 200) and the housing unit 100.

Additionally, when the second buffer member 520 is provided, the impact force that occurs when the lens unit 200 and the housing unit 100 collide with each other as the carrier 310 is moved in the optical axis direction (the Z-axis direction) may be dispersed over larger region and area.

In an example, referring to FIG. 6A. the buffer member 500 may include mounting portions 511 and 521 and deformed portions 512 and 522.

The deformed portion 512 or 522 is a portion that is deformed when contacted with the housing unit 100 when the carrier 310 is moved in the optical axis direction (the Z-axis direction), and may have a length in the optical axis direction (the Z-axis direction).

The deformed portion 512 or 522 may be continuously deformed while in contact with the housing unit 100 to absorb an impact, thereby reducing an impact sound. Accordingly, the deformed portion 512 or 522 may be made of a material which may be elastically deformed. In a non-limited example, the deformed portion 512 or 522 may be made of an elastomer material (e.g., a rubber material), as only an example.

The deformed portion 512 or 522 may have a symmetrical structure with respect to a direction perpendicular to the optical axis direction (the Z-axis direction). In other words, the upper and lower portions of the deformed portion 512 or 522 may have a length (considered) the same as each other based on its central portion in the length direction. Accordingly, the deformed portion 512 or 522 may have the same buffering performance in both the directions when the carrier 310 is moved in the optical axis direction (the Z-axis direction).

The buffer member 500 may be coupled to the carrier 310 through the mounting portions 511 and 521. In other words, the first buffer member 510 and the second buffer member 520 may be mounted on the carrier 310 through the mounting portions 511 and 521 while the deformed portions 512 and 522 are mounted on the mounting portions 511 and 521.

In an example, the buffer member 500 may be manufactured integrally with the carrier 310 or may be manufactured separately from the carrier 310 and then mounted on the carrier 310. For example, the buffer member 500 may be manufactured integrally with the carrier 310 in a double injection (or insert injection) method.

In another example, the buffer member 500 may be manufactured separately by a double injection (or insert injection) method, and then mounted on the carrier 310. In this example, as shown in the drawings, a groove 311 or 312 having a shape corresponding to a shape of the mounting portion 511 or 521 may be positioned in the side surface of the carrier 310, and the mounting portion 511 or 521 may be mounted in the groove 311 or 312.

As shown above, the camera module 1000, in accordance with one or more embodiments, may reduce the flow noise that occurs when the camera module is moved in the optical axis direction.

As set forth above, in accordance with one or more embodiments, the camera module may reduce the flow noise that occurs when the camera module is moved in the optical axis direction.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a housing unit;
   a carrier, accommodated in the housing unit, and configured to move in an optical axis direction;
   a lens unit, accommodated in the carrier, and in which one or more lenses are disposed;
   a first buffer member, disposed on a side surface of the carrier, and configured to protrude in a direction perpendicular to the optical axis direction, and having a length in the optical axis direction; and
   a second buffer member, disposed on the side surface of the carrier to be spaced apart from the first buffer member, and configured to have a cross section perpendicular to the optical axis direction that is different from a cross section of the first buffer member perpendicular to the optical axis direction,
   wherein the side surface of the carrier, on which the first buffer member and the second buffer member are disposed, has a length that extends in the direction perpendicular to the optical axis direction.

2. The camera module of claim 1, wherein the housing unit comprises a groove portion that extends in the optical axis direction, and configured to accommodate at least a portion of the first buffer member.

3. The camera module of claim 2, wherein the first buffer member comprises a plurality of first buffer members, and the plurality of first buffer members are disposed on respective side surfaces of the carrier in a first direction perpendicular to the optical axis direction.

4. The camera module of claim 3, wherein the plurality of first buffer members are configured to face the housing unit in the first direction.

5. The camera module of claim 4, wherein the second buffer member is configured to face the housing unit in a second direction perpendicular to the optical axis direction and the first direction.

6. The camera module of claim 5, wherein the cross section of the second buffer member perpendicular to the optical axis direction is larger than the first buffer member.

7. The camera module of claim 1, wherein a distance between the housing unit and the first buffer member in the optical axis direction is less than a distance between the carrier and the housing unit in the optical axis direction.

8. The camera module of claim 1, wherein the housing unit comprises:
a housing configured to accommodate the carrier; and
a shield can that is coupled to the housing while the housing accommodates the carrier, and
wherein the first buffer member is configured to come into contact with the housing or the shield can when the carrier is moved in the optical axis direction.

9. The camera module of claim 1, wherein the first buffer member and the second buffer member each comprises:
a mounting portion coupled to the carrier; and
a deformed portion, mounted on the mounting portion, and configured to deform when in contact with the housing unit when the carrier is moved in the optical axis direction.

10. The camera module of claim 9, wherein the deformed portion has a symmetrical structure with respect to the direction perpendicular to the optical axis direction.

11. The camera module of claim 1, further comprising one or more of:
a first actuator unit configured to move the carrier and the lens unit in the optical axis direction; and
a second actuator unit configured to move the lens unit in the direction perpendicular to the optical axis direction.

12. A camera module, comprising:
a carrier configured to accommodate a lens unit;
a housing configured to accommodate the carrier;
a shield can coupled to the housing while the housing accommodates the carrier;
a first buffer member disposed on a side surface of the carrier, and configured to protrude in a direction perpendicular to an optical axis direction, and having a length in the optical axis direction; and
a second buffer member disposed on the side surface of the carrier to be spaced apart from the first buffer member,
wherein the carrier is configured to move relative to the housing and the shield can in the optical axis direction,
wherein at least one of the first buffer member and the second buffer member is configured to come into contact with the shield can or the housing when the carrier is moved in the optical axis direction, and
wherein a contact area of the first buffer member with the housing or the shield can is different from a contact area of the second buffer member with the housing or the shield.

13. The camera module of claim 12, wherein a distance between the first buffer member and the shield can in the optical axis direction is less than a distance between the carrier and the shield can in the optical axis direction.

14. The camera module of claim 12, wherein the housing comprises a groove portion that extends in the optical axis direction, and
wherein the groove portion accommodates at least a portion of the buffer member.

15. The camera module of claim 14, wherein a distance between the first buffer member and the groove portion in the optical axis direction is less than a distance between the carrier and the housing in the optical axis direction.

16. The camera module of claim 12, wherein:
the first buffer member is disposed to face the shield can in a first direction perpendicular to the optical axis direction; and
wherein the second buffer member is disposed to face the shield can in a second direction perpendicular to the optical axis direction and the first direction.

17. The camera module of claim 1, wherein the second buffer member is disposed on an upper portion of the side of the carrier.

18. The camera module of claim 12, wherein a cross section of the second buffer member perpendicular to the optical axis direction is larger than a cross section of the first buffer member perpendicular to the optical axis direction.

* * * * *